United States Patent
Fan et al.

(10) Patent No.: US 11,306,403 B2
(45) Date of Patent: Apr. 19, 2022

(54) COPPER-PALLADIUM-LOADED MESOPOROUS SILICON CARBIDE-BASED CATALYST, PREPARATION METHOD AND APPLICATION THEREOF

(71) Applicant: Tongji University, Shanghai (CN)

(72) Inventors: Jianwei Fan, Shanghai (CN); Yue Wang, Shanghai (CN); Weixian Zhang, Shanghai (CN); Wei Teng, Shanghai (CN); Xianqiang Ran, Shanghai (CN); Bei Yu, Shanghai (CN); Xiaoqian Chen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/126,052

(22) Filed: Dec. 18, 2020

(65) Prior Publication Data
US 2021/0404077 A1    Dec. 30, 2021

(30) Foreign Application Priority Data

Jun. 30, 2020  (CN) .......................... 202010622992.7

(51) Int. Cl.
*B01J 37/04*   (2006.01)
*C25B 11/097*  (2021.01)
(Continued)

(52) U.S. Cl.
CPC ............. *C25B 11/097* (2021.01); *B01J 37/04* (2013.01); *B01J 37/06* (2013.01); *B01J 37/086* (2013.01);
(Continued)

(58) Field of Classification Search
CPC ....... C25B 1/01; C25B 11/054; C25B 11/067; C25B 11/081; C25B 11/097; B01J 23/8926; B01J 27/224; B01J 35/0033; B01J 37/0215; B01J 37/04; B01J 37/06; B01J 37/082; B01J 37/086; B01J 37/088;
(Continued)

(56) References Cited

U.S. PATENT DOCUMENTS

2010/0040834 A1* 2/2010 Dawes .................. C04B 35/573
428/158

* cited by examiner

*Primary Examiner* — Brian A McCaig
(74) *Attorney, Agent, or Firm* — Bayramoglu Law Offices L.L.C.

(57) ABSTRACT

A copper-palladium-loaded mesoporous silicon carbide-based catalyst, a preparation method, and an application thereof are provided. First, a mesoporous silicon carbide material is prepared by using mesoporous silica as a hard template; subsequently, the mesoporous silicon carbide material is mixed with a copper-palladium precursor mixed solution, and dried after the solvent is completely volatilized. The dried powder is successively subjected to calcination with $N_2$ and reduction with $H_2$ to finally obtain the copper-palladium-loaded mesoporous silicon carbide-based catalyst. The catalyst is made into an electrode, and the nitrate in water body is catalytically reduced by electrochemical method. The preparation method of the catalyst of the present invention is simple. The catalyst can realize high-efficiency catalytic denitrification at a low metal loading amount, with high selectivity of nitrogen. Moreover, the catalyst has the advantages of high activity, good stability, wide application range and low cost.

10 Claims, 4 Drawing Sheets

(51) Int. Cl.
  *C25B 11/067* (2021.01)
  *C25B 11/081* (2021.01)
  *C25B 1/01* (2021.01)
  *C25B 11/054* (2021.01)
  *B01J 37/06* (2006.01)
  *B01J 37/08* (2006.01)
  *B01J 37/18* (2006.01)

(52) U.S. Cl.
  CPC .............. *B01J 37/088* (2013.01); *B01J 37/18* (2013.01); *C25B 1/01* (2021.01); *C25B 11/054* (2021.01); *C25B 11/067* (2021.01); *C25B 11/081* (2021.01)

(58) Field of Classification Search
  CPC ........ B01J 37/10; B01J 37/18; C02F 1/46109; C02F 1/4676; C02F 2001/46142; C02F 2101/163
  See application file for complete search history.

|  | Embodiment 1 | Embodiment 2 | Embodiment 3 | Prior art comparative example |
|---|---|---|---|---|
| Removal rate of $NO_3^-$-N (%) | 94.5 | 94.7 | 92.9 | 86.2 |
| Selectivity of product nitrogen (%) | 91.2 | 83.4 | 79.0 | 60.9 |

FIG. 7

| Initial $NO_3^-$-N concentration (mg/L) | 100 | 200 | 300 | 500 |
|---|---|---|---|---|
| Removal rate of $NO_3^-$-N (%) | 94.5 | 92.4 | 85.4 | 75.7 |
| Selectivity of product nitrogen (%) | 91.2 | 89.8 | 91.6 | 86.4 |

FIG. 8

| Initial pH | 3 | 5 | 7 | 9 | 11 |
|---|---|---|---|---|---|
| Removal rate of $NO_3^-$-N (%) | 99.6 | 99.4 | 94.5 | 91.4 | 91.0 |
| Selectivity of product nitrogen (%) | 90.1 | 88.5 | 91.2 | 88.3 | 85.2 |

FIG. 9

COPPER-PALLADIUM-LOADED MESOPOROUS SILICON CARBIDE-BASED CATALYST, PREPARATION METHOD AND APPLICATION THEREOF

CROSS REFERENCE TO THE RELATED APPLICATIONS

This application is based upon and claims priority to Chinese Patent Application No. 2020106229927, filed on Jun. 30, 2020, the entire contents of which are incorporated herein by reference.

TECHNICAL FIELD

The present invention relates to the technical fields of preparation and application of catalysts, and particularly to a copper-palladium-loaded mesoporous silicon carbide-based catalyst, a preparation method and an application thereof.

BACKGROUND

Human activities such as the burning of fossil fuels, plants, garbage, and the discharge of untreated domestic sewage, industrial wastewater, livestock wastewater, and the large-scale synthesis and excessive use of nitrogen-containing fertilizers have caused nitrate pollution in bodies of water. Nitrate pollution in bodies of water seriously harms the ecological environment and human health. Traditional denitrification treatment technologies (including physical method, biological method, active metal reduction method, chemical catalytic hydrogenation method) have limitations such as requiring complicated operations, needing follow-up treatments, causing secondary pollution, and posing potential safety hazards. In contrast, electrocatalytic technology is simple, efficient, safe as well as economical, and can be applied to denitrification. Palladium-copper catalytic system has the activity of catalytic reduction of nitrate, but the efficiency and the nitrogen selectivity still need to be further improved.

SUMMARY

In view of the above-mentioned drawbacks and deficiencies of the prior art, a method for preparing a copper-palladium-loaded mesoporous silicon carbide-based catalyst is provided, which includes the following steps: S1. mixing and stirring P123 (polyethylene oxide-polypropylene oxide-polyethylene oxide, PEO-PPO-PEO), deionized water, hydrochloric acid, and tetraethyl orthosilicate (TEOS) to obtain a homogeneous solution; stirring the homogeneous solution in a water bath at 40° C. for 24 hours, then transferring into a stainless-steel autoclave for crystallization, followed by cooling, filtering, and drying, and calcining in a muffle furnace to obtain mesoporous silica which is used as a hard template for the preparation of mesoporous silicon carbide; S2. dissolving polycarbosilane in xylene to obtain a polycarbosilane solution, wherein a number-average molecular weight of the polycarbosilane is 1500 to 2500; mixing and stirring the mesoporous silica and the polycarbosilane solution, drying after the xylene solvent is completely volatilized, and subjecting dried powder to calcination, etching, washing and drying to obtain the mesoporous silicon carbide; S3. mixing $PdCl_2$ and $Cu(NO_3)_2 \cdot 3H_2O$ to obtain a copper-palladium precursor mixed solution; and S4. adding the mesoporous silicon carbide to the copper-palladium precursor mixed solution, drying after the solvent is completely evaporated, and calcination in a nitrogen atmosphere and reduction in a hydrogen atmosphere successively to obtain the copper-palladium-loaded mesoporous silicon carbide-based catalyst.

Preferably, in step S1, 2 g of the P123, 63.95 mL of the deionized water, and 10 mL of the hydrochloric acid are mixed and stirred, and then 4.25 g of the tetraethyl orthosilicate is added dropwise to obtain the homogeneous solution.

Preferably, in step S1, the crystallization is performed at a temperature of 130° C. for 72 hours; and the calcination is carried out for 6 hours in an air atmosphere, a required temperature of 550° C., and a heating rate of 1° C./min.

Preferably, a concentration of the polycarbosilane in the polycarbosilane solution is 10 wt %, and the mesoporous silica and the polycarbosilane are mixed in a mass ratio of 1:(1 to 1.2).

Preferably, in step S2, a drying temperature is 80° C., and a drying time is 12 hours; and the etching is to mix and stir with an excess of 4 wt % HF aqueous solution for 24 hours.

Preferably, the calcination process in step S2 is as follows: in a nitrogen atmosphere, first, raising the temperature to 350° C. at a rate of 2° C./min, and keeping the temperature for 5 hours; then raising the temperature to 700° C. at a rate of 0.5° C./min; and then raising the temperature to 1200° C.-1400° C. at a rate of 2° C./min, and keeping the temperature for 2 hours; finally, naturally cooling to room temperature under nitrogen protection.

Preferably, in the copper-palladium precursor mixed solution: a mass concentration of palladium is 0.1-5 g/L; a mass concentration of copper is 0.05-2.5 g/L; and a mass ratio of palladium to copper is 2:1.

Preferably, in step S4, a mass concentration of the mesoporous silicon carbide in the copper-palladium precursor mixed solution is 100 g/L; a drying temperature is 80° C., and a drying time is 12 hours; conditions for the calcination and the reduction are as follows: a required temperature is 400° C., and a heating rate is 1° C./min; a time for the calcination in the nitrogen atmosphere is 3 hours, and a time for the reduction in the hydrogen atmosphere is 1 hour.

The present invention further provides a copper-palladium-loaded mesoporous silicon carbide-based catalyst, which is prepared by using the method for preparing the copper-palladium-loaded mesoporous silicon carbide-based catalyst.

The present invention further provides an application of a copper-palladium-loaded mesoporous silicon carbide-based catalyst, which adopts the above-mentioned copper-palladium-loaded mesoporous silicon carbide-based catalyst.

Compared with the prior art, the present invention has the following advantages and positive effects due to the adoption of the above technical solution:

1. In the copper-palladium-loaded mesoporous silicon carbide-based catalyst, the preparation method and the application thereof provided by the present invention, the palladium and the copper are used as active components for catalytic denitrification, and the mesoporous silicon carbide serves as both a catalyst carrier and a hydrogen-producing catalyst. In addition, the preparation method of the catalyst is simple, and the prepared catalyst can efficiently catalyze the reduction of nitrate even at a low loading amount, and pose high nitrogen selectivity. The prepared catalyst can be used for electrocatalytic denitrification reactions of nitrate-contaminated water with various initial concentrations and pH.

2. In the copper-palladium-loaded mesoporous silicon carbide-based catalyst, the preparation method and the application thereof provided by the present invention, the mesoporous silicon carbide-based material is used as a catalyst carrier. On the one hand, the mesoporous silicon carbide can stably disperse the palladium and the copper in the mesoporous, prevent the agglomeration of palladium and copper, and provide more active sites, thereby improving the catalytic denitrification activity of the palladium and the copper. On the other hand, the mesoporous silicon carbide has thermal stability, chemical stability and high mechanical strength, and can perform autocatalyzed water electrolysis to produce hydrogen, and the hydrogen can promote the denitrification reaction, so that the palladium-copper-loaded mesoporous silicon carbide-based catalyst prepared by the present invention has a better catalytic effect than other palladium-copper-loaded catalysts.

BRIEF DESCRIPTION OF THE DRAWINGS

FIG. 7 shows removal rates of nitrate nitrogen ($NO_3^-$—N) and a selectivity of product nitrogen in catalytic reaction systems of a catalyst in embodiment 1, a catalyst in embodiment 2, a catalyst in embodiment 3 of the present invention and a catalyst in the prior art comparative example;

FIG. 8 shows a removal rate of nitrate nitrogen ($NO_3^-$—N) and a selectivity of product nitrogen of the catalyst in a neutral reaction system with a $NO_3^-$—N concentration of 100-500 mg/L in embodiment 1 of the present invention; and FIG. 9 shows a removal rate of nitrate nitrogen ($NO_3^-$—N) and a selectivity of product nitrogen of the catalyst in a reaction system with a $NO_3^-$—N concentration of 100 mg/L and an initial pH of 3-11 in embodiment 1 of the present invention.

DETAILED DESCRIPTION OF THE EMBODIMENTS

Hereinafter, referring to the attached figures of the embodiments of the present invention, the present invention is described in more detail below. It is worth noting that the present invention can be implemented in many different forms and shall not be limited by the embodiments presented herein. On the contrary, these embodiments are presented to achieve a full and complete disclosure and to enable those skilled in this field to fully understand the protective scope of the present invention. In these figures, the dimensions and relative dimensions of layers and regions may have been enlarged for clarity.

The following illustration is made with three embodiments and a prior art comparative example.

Embodiment 1, a preparation method of a palladium-copper-loaded mesoporous silicon carbide-based catalyst, which includes the steps as follows.

(1) 2 g of surfactant P123 (polyethylene oxide-polypropylene oxide-polyethylene oxide, PEO-PPO-PEO), 63.95 mL of deionized water and 10 mL of hydrochloric acid (12 M) were taken and put into a beaker, stirred until completely dissolved, and 4.25 g of tetraethyl orthosilicate (TEOS) was subsequently added dropwise to the beaker. A mechanical stirring was performed in a 40° C. water bath for 24 hours, and then the solution in the beaker was poured into a stainless-steel autoclave. Subsequently, the stainless-steel autoclave was placed in a 130° C. oven for static crystallization for 72 hours, followed by being subjected to cooling, filtering, drying and then calcining in a 550° C. muffle furnace for 6 hours to obtain mesoporous silica.

(2) 5 g of the mesoporous silica was taken and added to a 10 wt % xylene solution of polycarbosilane containing 6 g of the polycarbosilane, mixed and stirred until the xylene was completely volatilized, and then placed in an 80° C. oven for drying for 12 hours. After drying, the dried powder was placed in a tube furnace and calcined in a nitrogen atmosphere. In the tube furnace, the temperature was first raised to 350° C. at a rate of 2° C./min and kept for 5 hours, then raised to 700° C. at a rate of 0.5° C./min, and then raised to 1400° C. at a rate of 2° C./min and kept for 2 hours, and finally the dried powder was naturally cooled to room temperature under nitrogen protection. The cooled powder was taken and added to an excess of 4 wt % HF aqueous solution, stirred at room temperature for 24 hours, and then subjected to repeated washing, filtering, and drying to obtain mesoporous silicon carbide. The drying condition was 80° C. and the drying time was 12 hours.

(3) $PdCl_2$ and $Cu(NO_3)_2 \cdot 3H_2O$ were mixed to obtain a copper-palladium precursor mixed solution. In the copper-palladium precursor mixed solution, a mass concentration of the palladium is 0.1 g/L; a mass concentration of the copper is 0.05 g/L.

Figure 1:
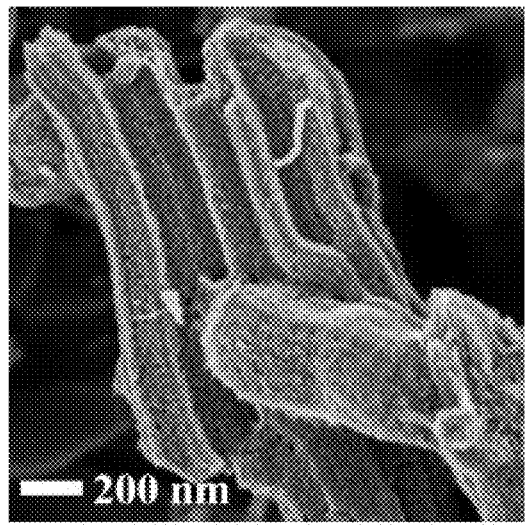
FIG. 1 shows a scanning electron microscope (SEM) image of a copper-palladium-loaded mesoporous silicon carbide-based material in embodiment 1 of the present invention.
Figure 4:
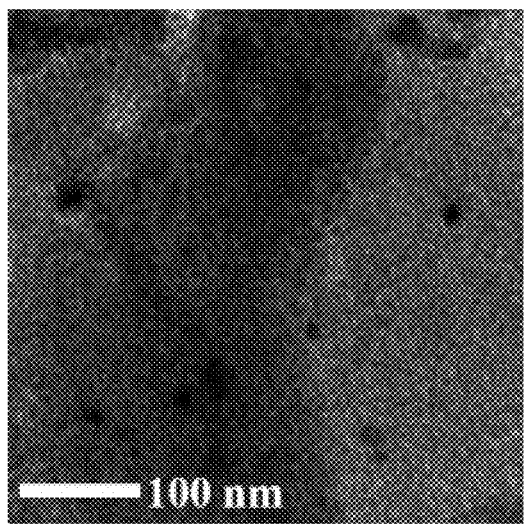
FIG. 4 shows a transmission electron microscope (TEM) image of a copper-palladium-loaded mesoporous silicon carbide-based material in embodiment 1 of the present invention.

(4) 1 g of the mesoporous silicon carbide was taken and added to 10 mL of the copper-palladium precursor mixed solution, mixed and stirred until the solvent was completely volatilized, dried in an 80° C. oven for 12 hours, and then placed in a tube furnace. The temperature was raised to 400° C. at a rate of 1° C./min for calcination in a nitrogen atmosphere for 3 hours and reduction in a hydrogen atmosphere for 1 hour to obtain a mesoporous silicon carbide-based catalyst loaded with palladium (0.1%) and copper (0.05%). The surface morphology of the mesoporous silicon carbide-based catalyst loaded with palladium and copper is shown in FIG. 1 and FIG. 4.

4 mg of the mesoporous silicon carbide-based catalyst loaded with palladium (0.1%) and copper (0.05%) was taken and coated on a nickel foam to make a working electrode, a platinum electrode was used as a counter electrode, and a saturated calomel electrode was used as a reference electrode. The three electrodes were placed in a neutral solution with a volume of 20 mL and a $NO_3^-$—N concentration of 100 mg/L, and a voltage of −1.5 V was applied for reaction for 24 hours. Subsequently, the concentration of the nitrate was measured after the reaction, and the removal rate of the nitrate and the selectivity of the nitrogen were calculated. The results are shown in FIG. 7.

The three electrodes were placed in neutral solutions with $NO_3^-$—N concentrations of 200 mg/L, 300 mg/L, and 500 mg/L, respectively, and a voltage of −1.5 V was applied for reaction for 24 hours. Subsequently, the concentration of the nitrate was measured after the reaction, and the removal rate of the nitrate and the selectivity of the nitrogen were calculated. The results are shown in FIG. 8. It can be seen from the results that the palladium-copper-loaded mesoporous silicon carbide-based catalyst prepared by the present invention can be used for the electrocatalytic denitrification reaction of nitrate-contaminated water with various initial concentrations.

The three electrodes were placed in solutions with a $NO_3^-$—N concentration of 100 mg/L and an initial pH of 3-11, respectively, and a voltage of −1.5 V was applied for reaction for 24 hours. Subsequently, the concentration of the nitrate was measured after the reaction, and the removal rate of the nitrate and the selectivity of the nitrogen were calculated. The results are shown in FIG. 9. It can be seen from the results that the palladium-copper-loaded mesoporous silicon carbide-based catalyst prepared by the present invention can be used for the electrocatalytic denitrification reaction of nitrate-contaminated water with various initial pH.

Embodiment 2, a preparation method of a palladium-copper-loaded mesoporous silicon carbide-based catalyst, which includes the steps as follows.

(1) 2 g of surfactant P123, 63.95 mL of deionized water and 10 mL of hydrochloric acid (12 M) were taken and put into a beaker, stirred until completely dissolved, and 4.25 g of tetraethyl orthosilicate was subsequently added dropwise to the beaker. A mechanical stirring was performed in a 40° C. water bath for 24 hours, and then the solution in the beaker was poured into a stainless-steel autoclave. Subsequently, the stainless-steel autoclave was placed in a 130° C. oven for static crystallization for 72 hours, followed by being subjected to cooling, filtering, drying and then calcining in a 550° C. muffle furnace for 6 hours to obtain mesoporous silica.

(2) 5 g of the mesoporous silica was taken and added to a 10 wt % xylene solution of polycarbosilane containing 6 g of the polycarbosilane, mixed and stirred until the xylene was completely volatilized, and then placed in a 80° C. oven for drying for 12 hours. After drying, the dried powder was placed in a tube furnace and calcined in a nitrogen atmosphere. In the tube furnace, the temperature was first raised to 350° C. at a rate of 2° C./min and kept for 5 hours, then raised to 700° C. at a rate of 0.5° C./min, and then raised to 1400° C. at a rate of 2° C./min and kept for 2 hours, and finally the dried powder was naturally cooled to room temperature under nitrogen protection. The cooled powder was taken and added to an excess of 4 wt % HF aqueous solution, stirred at room temperature for 24 hours, and then subjected to repeated washing, filtering, and drying to obtain mesoporous silicon carbide. The drying condition was 80° C. and the drying time was 12 hours.

(3) $PdCl_2$ and $Cu(NO_3)_2 \cdot 3H_2O$ were mixed to obtain a copper-palladium precursor mixed solution. In the copper-palladium precursor mixed solution, a mass concentration of the palladium is 1 g/L; a mass concentration of the copper is 0.5 g/L.

Figure 2:
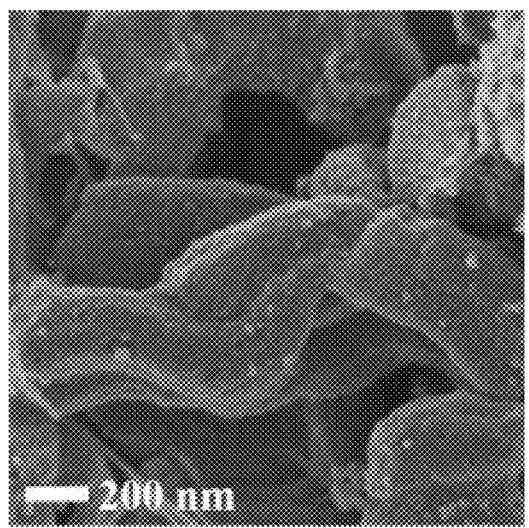
FIG. 2 shows a scanning electron microscope (SEM) image of a copper-palladium-loaded mesoporous silicon carbide-based material in embodiment 2 of the present invention.
Figure 5:
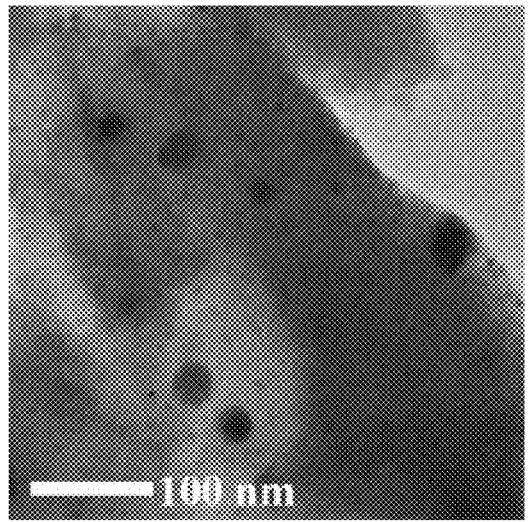
FIG. 5 shows a transmission electron microscope (TEM) image of a copper-palladium-loaded mesoporous silicon carbide-based material in embodiment 2 of the present invention.

(4) 1 g of the mesoporous silicon carbide was taken and added to 10 mL of the copper-palladium precursor mixed solution, mixed and stirred until the solvent was completely volatilized, dried in a 80° C. oven for 12 hours, and then placed in a tube furnace. The temperature was raised to 400° C. at a rate of 1° C./min for calcination in a nitrogen atmosphere for 3 hours and reduction in a hydrogen atmosphere for 1 hour to obtain a mesoporous silicon carbide-based catalyst loaded with palladium (1%) and copper (0.5%). The surface morphology of the mesoporous silicon carbide-based catalyst loaded with palladium and copper is shown in FIG. 2 and FIG. 5.

4 mg of the mesoporous silicon carbide-based catalyst loaded with palladium (1%) and copper (0.5%) was taken and coated on a nickel foam to make a working electrode, a platinum electrode was used as a counter electrode, and a saturated calomel electrode was used as a reference electrode. The three electrodes were placed in a neutral solution with a volume of 20 mL and a $NO_3^-$—N concentration of 100 mg/L, and a voltage of −1.5 V was applied for reaction for 24 hours. Subsequently, the concentration of the nitrate was measured after the reaction, and the removal rate of the nitrate n and the selectivity of the nitrogen were calculated. The results are shown in FIG. 7.

Embodiment 3, a preparation method of a palladium-copper-loaded mesoporous silicon carbide-based catalyst, which includes the steps as follows.

(1) 2 g of surfactant P123, 63.95 mL of deionized water and 10 mL of hydrochloric acid (12 M) were taken and put into a beaker, stirred until completely dissolved, and 4.25 g of tetraethyl orthosilicate (TEOS) was subsequently added dropwise to the beaker. A mechanical stirring is performed in a 40° C. water bath for 24 hours, and then the solution in the beaker was poured into a stainless-steel autoclave. Subsequently, the stainless-steel autoclave was placed in a 130° C. oven for static crystallization for 72, followed by being subjected to cooling, filtering, drying and calcining in a 550° C. muffle furnace for 6 hours to obtain mesoporous silica.

(2) 5 g of the mesoporous silica was taken and added to a 10 wt % xylene solution of polycarbosilane containing 6 g of the polycarbosilane, mixed and stirred until the xylene was completely volatilized, and then placed in a 80° C. oven for drying for 12 hours. After drying, the dried powder was placed in a tube furnace and calcined in a nitrogen atmosphere. In the tube furnace, the temperature was first raised to 350° C. at a rate of 2° C./min and kept for 5 hours, then raised to 700° C. at a rate of 0.5° C./min, and then raised to 1400° C. at a rate of 2° C./min and kept for 2 hours, and finally the dried powder was naturally cooled to room temperature under nitrogen protection. The cooled powder was taken and added to an excess of 4 wt % HF aqueous solution, stirred at room temperature for 24 hours, and then subjected to repeated washing, filtering, and drying to obtain mesoporous silicon carbide. The drying condition was 80° C. and the drying time was 12 hours.

(3) $PdCl_2$ and $Cu(NO_3)_2 \cdot 3H_2O$ were mixed to obtain a copper-palladium precursor mixed solution. In the copper-palladium precursor mixed solution, a mass concentration of the palladium is 5 g/L; a mass concentration of the copper is 2.5 g/L.

Figure 3:
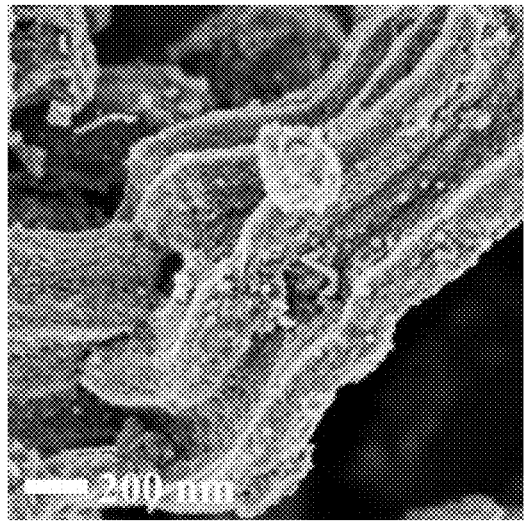
FIG. 3 shows a scanning electron microscope (SEM) image of a copper-palladium-loaded mesoporous silicon carbide-based material in embodiment 3 of the present invention.
Figure 6:
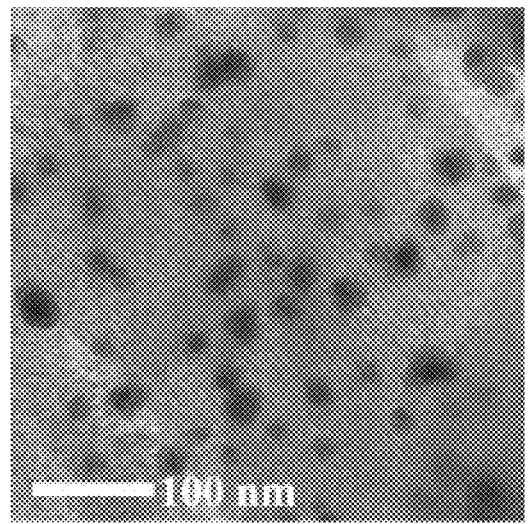
FIG. 6 shows a transmission electron microscope (TEM) image of a copper-palladium-loaded mesoporous silicon carbide-based material in embodiment 3 of the present invention.

(4) 1 g of the mesoporous silicon carbide was taken and added to 10 mL of the copper-palladium precursor mixed solution, mixed and stirred until the solvent was completely volatilized, dried in an 80° C. oven for 12 hours, and then placed in a tube furnace. The temperature was raised to 400° C. at a rate of 1° C./min for calcination in a nitrogen atmosphere for 3 hours and reduction in a hydrogen atmosphere for 1 hour to obtain a mesoporous silicon carbide-based catalyst loaded with palladium (5%) and copper (2.5%). The surface morphology of the mesoporous silicon carbide-based catalyst loaded with palladium and copper is shown in FIG. 3 and FIG. 6.

4 mg of the mesoporous silicon carbide-based catalyst loaded with palladium (5%) and copper (2.5%) was taken and coated on a nickel foam to make a working electrode, a platinum electrode was used as a counter electrode, and a saturated calomel electrode was used as a reference electrode. The three electrodes were placed in a neutral solution with a volume of 20 mL and a $NO_3^-$—N concentration of 100 mg/L, and a voltage of −1.5 V was applied for reaction for 24 hours. Subsequently, the concentration of the nitrate nitrogen was measured after the reaction, and the removal rate of the nitrate and the selectivity of the nitrogen were calculated. The results are shown in FIG. 7.

Prior art comparative example, a nitrogen-doped mesoporous carbon-based catalyst loaded with palladium and copper was prepared and applied to electrocatalytic removal of nitrate in water body. Specifically, 4 mg of catalyst was coated on a nickel foam to make a working electrode, a platinum electrode was used as a counter electrode, and a saturated calomel electrode was used as a reference electrode. The three electrodes were placed in a neutral solution with a volume of 20 mL and a $NO_3^-$—N concentration of 100 mg/L, and a voltage of −1.5 V was applied for reaction for 24 hours. Subsequently, the concentration of the nitrate was measured after the reaction, and the removal rate of the nitrate and the selectivity of the nitrogen were calculated. The results are shown in FIG. 7.

It can be seen from FIG. 7 that the palladium-copper-loaded mesoporous silicon carbide-based catalyst prepared by the present invention has a higher catalytic activity at a low loading amount. Compared with the existing palladium-copper catalytic system, the catalyst of the present invention has higher removal rate of the nitrate in water body and significantly improved selectivity of the nitrogen. Especially, the catalyst with a palladium loading amount of 0.1% and a copper loading amount of 0.05% in embodiment 1 achieves the nitrate nitrogen removal rate of 94.5% and the product nitrogen selectivity of up to 91.2%.

Those skilled in the art should understand that the present invention can be implemented in many other specific forms without departing from the spirit or scope of the present invention. Although the embodiments of the present invention have been described, it should be understood that the present invention shall not be limited to such embodiments. Those skilled in the art can make changes and modifications within the spirit and scope of the present invention as defined by the appended claims.

What is claimed is:

1. A method for preparing a copper-palladium-loaded mesoporous silicon carbide-based catalyst, comprising the following steps:
   S1. mixing and stirring P123, water, hydrochloric acid, and tetraethyl orthosilicate to obtain a homogeneous solution; stirring the homogeneous solution in a water bath for crystallization to obtain a crystallized solution, then performing a first treatment of cooling, filtering, drying and calcination on the crystallized solution to obtain mesoporous silica;
   S2. dissolving polycarbosilane in xylene to obtain a polycarbosilane solution, wherein a number-average molecular weight of the polycarbosilane is 1500-2500; mixing and stirring the mesoporous silica and the polycarbosilane solution to obtain a first mixture, drying the first mixture after the xylene is completely volatilized to obtain a first dried powder, and then subjecting the first dried powder to a second treatment of calcination, etching, washing and drying to obtain mesoporous silicon carbide;
   S3. mixing $PdCl_2$ and $Cu(NO_3)_2.3H_2O$ to obtain a copper-palladium precursor mixed solution; and
   S4. adding the mesoporous silicon carbide to the copper-palladium precursor mixed solution to obtain a second mixture, drying the second mixture after a solvent of the second mixture is completely volatilized to obtain a second dried powder, and then subjecting the second dried powder to a third treatment of calcination in a nitrogen atmosphere and reduction in a hydrogen atmosphere to obtain the copper-palladium-loaded mesoporous silicon carbide-based catalyst.

2. The method according to claim 1, wherein in step S1, 2 g of the P123, 63.95 mL, of the water, and 10 mL of the hydrochloric acid are mixed and stirred to obtain a first mixed solution, and 4.25 g of the tetraethyl orthosilicate is added dropwise to the first mixed solution to obtain the homogeneous solution.

3. The method according to claim 2, wherein in step S1, the crystallization is performed at a temperature of 130° C. for 72 hours; and
   the calcination of the first treatment is performed for 6 hours under conditions of an air atmosphere, a required temperature of 550° C., and a heating rate of 1° C./min.

4. The method according to claim 1, wherein in step S1, the crystallization is performed at a temperature of 130° C. for 72 hours; and
   the calcination of the first treatment is performed for 6 hours under conditions of an air atmosphere, a required temperature of 550° C., and a heating rate of 1° C./min.

5. The method according to claim 1, wherein a concentration of the polycarbosilane in the polycarbosilane solution is 10 wt %, and the mesoporous silica and the polycarbosilane solution are mixed in a mass ratio of 1:(1-1.2).

6. The method according to claim 5, wherein in step S2:
   a drying temperature is 80° C., and a drying time is 12 hours; and
   the etching is to mix and stir the first dried powder with an excess of 4 wt % HF aqueous solution for 24 hours.

7. The method according to claim 1, wherein in step S2:
   a drying temperature is 80° C., and a drying time is 12 hours; and
   the etching is to mix and stir the first dried powder with an excess of 4 wt % HF aqueous solution for 24 hours.

8. The method according to claim 1, wherein, the calcination in step S2 is as follows: in a nitrogen atmosphere, first, raising a temperature of the first dried powder to 350° C. at a rate of 2° C./min, and keeping the temperature at 350° C. for 5 hours; then raising the temperature to 700° C. at a rate of 0.5° C./min; and then raising the temperature to 1200° C.-1400° C. at the rate of 2° C./min, and keeping the temperature at 1200° C.-1400° C. for 2 hours; finally, naturally cooling the first dried powder to room temperature under a protection of nitrogen.

9. The method according to claim 1, wherein in the copper-palladium precursor mixed solution: a mass concentration of palladium is 0.1-5 g/L; a mass concentration of copper is 0.05-2.5 g/L; and a mass ratio of the palladium to the copper is 2:1.

10. The method according to claim 1, wherein in step S4:
    a mass concentration of the mesoporous silicon carbide in the copper-palladium precursor mixed solution is 100 g/L;
    a drying temperature is 80° C., and a drying time is 12 hours; and conditions for the calcination and the reduction of the third treatment are as follows: a required temperature is 400° C., and a heating rate is 1° C./min; a time for the calcination in the nitrogen atmosphere is 3 hours, and a time for the reduction in the hydrogen atmosphere is 1 hour.

* * * * *